(12) United States Patent
Zhang

(10) Patent No.: US 10,279,301 B2
(45) Date of Patent: May 7, 2019

(54) STRIP, FILTER WITH THE STRIP, METHOD AND APPARATUS FOR PRODUCING THE STRIP

(71) Applicant: KONINKLIJKE PHILIPS N.V., Eindhoven (NL)

(72) Inventor: Hong Zhang, Beijing (CN)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 14/439,100

(22) PCT Filed: Oct. 23, 2013

(86) PCT No.: PCT/IB2013/059560
§ 371 (c)(1),
(2) Date: Apr. 28, 2015

(87) PCT Pub. No.: WO2014/068445
PCT Pub. Date: May 8, 2014

(65) Prior Publication Data
US 2015/0273383 A1    Oct. 1, 2015

(30) Foreign Application Priority Data

Nov. 1, 2012 (WO) ................. PCT/CN12/83936

(51) Int. Cl.
*B01D 46/00*  (2006.01)
*B01D 46/52*  (2006.01)
*B01D 46/10*  (2006.01)

(52) U.S. Cl.
CPC ....... *B01D 46/521* (2013.01); *B01D 46/0002* (2013.01); *B01D 46/0005* (2013.01);
(Continued)

(58) Field of Classification Search
CPC ........ B01D 46/04; B01D 46/08; B01D 46/10; B01D 46/41–46/42; B01D 46/52;
(Continued)

(56) References Cited

U.S. PATENT DOCUMENTS 2,988,227 A * 6/1961 Harms ................... B01D 29/21
                                                        210/487
5,618,324 A    4/1997 Sommer et al.
(Continued)

FOREIGN PATENT DOCUMENTS

CN    1094989 A    11/1994
CN    201755438 U    3/2011
(Continued)

OTHER PUBLICATIONS

First Office Action dated Aug. 17, 2016, China Application No. 20130057441.9, 12 pages.
(Continued)

*Primary Examiner* — T. Bennett McKenzie

(57) ABSTRACT

A strip according to the invention includes a plurality of first creases distributed along the first side of the strip, a plurality of second creases distributed along the second side of the strip, and the plurality of first creases being able to extend and the plurality of second creases being able to shrink, thereby the strip being bendable towards the second side. The strip according to the invention is able to be bendable as well as not easily deformed.

14 Claims, 5 Drawing Sheets

(52) U.S. Cl.
CPC ........... *B01D 46/10* (2013.01); *B01D 46/523* (2013.01); *B01D 2275/203* (2013.01)

(58) Field of Classification Search
CPC ............... B01D 46/521; B01D 46/527; B01D 46/2411; B01D 46/4227; B01D 46/00; B01D 46/0002; B01D 46/0005; B01D 46/523; B01D 2275/203
USPC .................................................. 55/490–519
See application file for complete search history.

(56) References Cited

U.S. PATENT DOCUMENTS

| | | | |
|---|---|---|---|
| 5,679,122 A * | 10/1997 | Moll | B01D 46/0005 |
| | | | 210/493.3 |
| 5,779,747 A * | 7/1998 | Schlor | B01D 46/10 |
| | | | 55/497 |
| 5,792,228 A | 8/1998 | Fath et al. | |
| 5,814,219 A | 9/1998 | Friedmann et al. | |
| 2001/0022069 A1 | 9/2001 | Fath et al. | |
| 2004/0035096 A1* | 2/2004 | Ham | B01D 46/0005 |
| | | | 55/497 |
| 2008/0148946 A1 | 6/2008 | Lotgerink-Bruinenberg | |
| 2009/0044503 A1 | 2/2009 | Ammersdoerfer | |
| 2009/0090091 A1 | 4/2009 | Kuempel et al. | |
| 2010/0330218 A1 | 12/2010 | Hung | |
| 2011/0078985 A1* | 4/2011 | Belcher | B01D 46/0068 |
| | | | 55/302 |

FOREIGN PATENT DOCUMENTS

| | | | |
|---|---|---|---|
| DE | 4039288 A1 | 6/1992 | |
| DE | 10138880 A1 | 1/2003 | |
| DE | 10111118 B4 * | 10/2014 | ......... B01D 39/1623 |
| EP | 0692293 A1 | 1/1996 | |
| JP | 8108015 A | 4/1996 | |
| JP | 10-113519 | 5/1998 | |
| JP | 11351657 A | 12/1999 | |
| KR | 100720763 B1 * | 5/2007 | ............ B01D 46/00 |
| WO | 1999065593 A1 | 12/1999 | |
| WO | 2011017352 A2 | 2/2011 | |

OTHER PUBLICATIONS

Second Office Action dated Mar. 2, 2017, China Appliction No. 201380057441.9, 9 pages.

JPO Office Action dated May 16, 2017, Japan Application No. 2015-538607, 9 pages.

EPO as ISA, PCT/IB2013/059560 filed Oct. 23, 2013, "International Search Report and Written Opinion", dated May 3, 2016, 14 pages.

* cited by examiner

STRIP, FILTER WITH THE STRIP, METHOD AND APPARATUS FOR PRODUCING THE STRIP

CROSS-REFERENCE TO PRIOR APPLICATIONS

This application is the U.S. National Phase application under 35 U.S.C. § 371 of International Application No. PCT/IB13/059560, filed on Oct. 23, 2013, which claims the benefit of International Application No. PCT/CN2012/083936, filed on Nov. 01, 2012. These applications are hereby incorporated by reference herein.

TECHNICAL FIELD

The present invention relates to a strip for a filter, to a filter comprising such strip and to an apparatus and method to produce such strip.

BACKGROUND OF THE INVENTION

Air filters are commonly used for particulate material filtration and gaseous chemical decontamination for residential, commercial, industrial and any other applications requiring air treatments, including but not limited to air cleaning, air purification, air deodorizing, air decontaminating.

The U.S. Pat. No. 5,779,747 discloses a flexible folded filter insert which is not noticeably deformed by the air which it cleans. The insert has a fold pattern which is closed off at the end by flexible strips which can be compressed in the longitudinal direction. Because of the elasticity of the strips, torsion of the folded filter insert relative to an axis along the fold pattern and/or bending with reference to at least one axis crosswise to the fold pattern is possible.

SUMMARY OF THE INVENTION

According to the prior art U.S. Pat. No. 5,779,747, the strip has flat surface, and the elasticity of the strips enables the torsion of the folded filter insert. However, the elastic strips are easy to deform and leak air, therefore decreasing the filtration efficiency.

It would be advantageous to achieve a strip that is able to be bendable as well as not easily deformed.

According to a first aspect of the invention, there is provided a strip comprising a plurality of first creases distributed along the first side of the strip; a plurality of second creases distributed along the second side of the strip; wherein the plurality of first creases being able to extend and the plurality of second creases being able to shrink, thereby the strip being bendable towards the second side.

In this embodiment, with the extension or stretch of the first creases and the shrinking of the second creases, the strip is able to bend towards the second side where the second creases are distributed.

In another embodiment, the plurality of the first creases being able to shrink and the plurality of second creases being able to extend, thereby the strip being bendable towards the first side.

In this embodiment, with the shrinking of the first creases and the extension of the second creases, the strip is able to bend towards the first side where the first creases are distributed.

In another embodiment, the plurality of first creases and the plurality of second creases are protruding towards a same direction.

In this embodiment, since the first creases and the second creases are protruding towards the same direction, the protrusions of the first creases and the second creases can be used to restrict folds of the filtering member within appropriate locations.

In another embodiment, the plurality of first creases and the plurality of second creases are alternating along the longitudinal direction of the strip.

In this embodiment, the first crease is not aligned with second crease. In fact, each first crease (except the first crease at the edge) interleaves with two second creases.

In another embodiment, the strip further comprises a first flat portion between each pair of neighboring first creases, and a second flat portion between each pair of neighboring second creases.

In this embodiment, each pair of neighboring first creases holds the peak of a fold of the filtering member in the proper location, and each pair of neighboring second creases holds the bottom of a fold of the filtering member in the proper location. With the above configuration of the first creases and the second creases, a zigzag path is formed by the spacing between neighboring first crease and second crease. Therefore, folds of the filtering member can be restricted along the zigzag path.

In another embodiment, the sum of the lengths of one of the plurality of the first creases and one of the plurality of the second creases are larger than the width of the strip and less than the two times of the width of the strip.

In this embodiment, the sum of the lengths of one first crease and the length of one second creases are larger than the width of the strip, so as to enable the strip to bend towards the first side or the second side. And the length of each of the first and second creases is less than the width of the strip, so as to avoid too much bending stress acting on the side strip to cause fatigue of the strip, thereby improving the life of the side strip.

In another embodiment, the cross section of each of the plurality of first creases is decreasing from the first side to the second side, and the cross section of each of the plurality of second creases is decreasing from the second side to the first side.

In this embodiment, the first creases are tapered from the first side to the second side, and the second creases are tapered from the second side to the first side. In other words, the first creases are tapered from the lateral edge of the strip to the internal part of the strip, and second creases are tapered from another lateral edge of the strip to the internal part of the strip. With the tapered structure, the first crease and the second crease are easy to extend or shrink.

In another embodiment, each of the plurality of first and second creases is of a ridge shape.

In another embodiment, the strip is made of polymer material, and the plurality of first and second creases are formed integrally on the strip.

In this embodiment, the strip can be made of polymer material, for example, Polypropylene (PP) etc. Such material is usually rigid and has strength to support the filtering member.

According to a second aspect of the invention, there is provided a filter, comprising two opposite strips for supporting an filtering member; the filtering member having a plurality of folds, wherein a first creases of the strip is received between neighboring peaks of folds, and a second crease of the strip is received between neighboring bottoms of folds.

In this embodiment, the strip is used as the frame for holding the filtering member. A fold can be divided into two parts: a peak part and a bottom part. When the strip and the filtering member are assembled into the filter, if the first creases are upwards and the second creases are downwards, then the first crease of the strip is received by neighboring peaks of folds, and the second crease of the strip is received by neighboring bottoms of folds. The zigzag path between the first crease and the second crease is used to receive the fold. With the filter being bendable, the filter could be fit into any curved installation shape.

The creases on strip could also act as spacers that could keep the separation space between pleated folds uniform, through inserting of protrusions of creases into the pleated folds during the forming process.

In another embodiment, the filter further comprises adhesive material, for binding the filtering member with the strips.

With the adhesive material, the strip and the filtering member can be bound together. Therefore, it is hard for the filtering member to get out of the frame formed by the strips when the filter is bended. Thus the phenomena of leakage of air can be avoided, and the filtration efficiency can be improved.

According to a third aspect of the invention, there is provided an apparatus for producing the strip. The apparatus comprises: a first roller and a second roller opposed to each other, for rolling a workpiece into the strip; wherein the first roller has a plurality of first protrusions on one side of the outer surface of the first roller and a plurality of second protrusions on the other side of the outer surface of the first roller, and the second roller has a plurality of first recesses on one side of the outer surface of the second roller and a plurality of second recesses on the other side of the outer surface of the second roller, and the plurality of first and second recesses receive the plurality of first and second protrusions respectively when the two rollers roll, for shaping the plurality of first and second creases of the strip.

In this embodiment, the first roller and the second roller are specially designed so as to process the workpiece into the strip.

In another embodiment, the plurality of the first protrusions and the plurality of the second protrusions are alternating.

In another embodiment, the distance between the rolling surfaces of the first roller and the second roller are from 0.5 mm to 3.0 mm, so as to allow the workpiece to pass through the space and to be processed by the rollers.

According to a fourth aspect of the invention, there is provided a method of producing the strip, comprising: rolling the apparatus; and feeding a workpiece into the apparatus; wherein the first roller and the second roller are heated to 125 to 315 degree Celsius.

BRIEF DESCRIPTION OF THE DRAWINGS

Features, aspects and advantages of the present invention will become obvious by reading the following description of non-limiting embodiments with the aid of appended drawings. Wherein, same or similar reference numerals refer to the same or similar steps or means.

DETAILED DESCRIPTION OF EMBODIMENTS

Reference will now be made to embodiments of the invention, one or more examples of which are illustrated in the figures. The embodiments are provided by way of explanation of the invention, and are not meant as a limitation of the invention. For example, features illustrated or described as part of one embodiment may be used with another embodiment to yield still a further embodiment. It is intended that the invention encompass these and other modifications and variations as come within the scope and spirit of the invention.

In the following detailed description, reference is made to the accompanying drawings, which form a part hereof, and in which is shown by way of illustration specific embodiments in which the invention may be practiced. In this regard, directional terminology, such as "left", "right", "top", "bottom", "front", "back", "leading", "forward", "trailing", etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
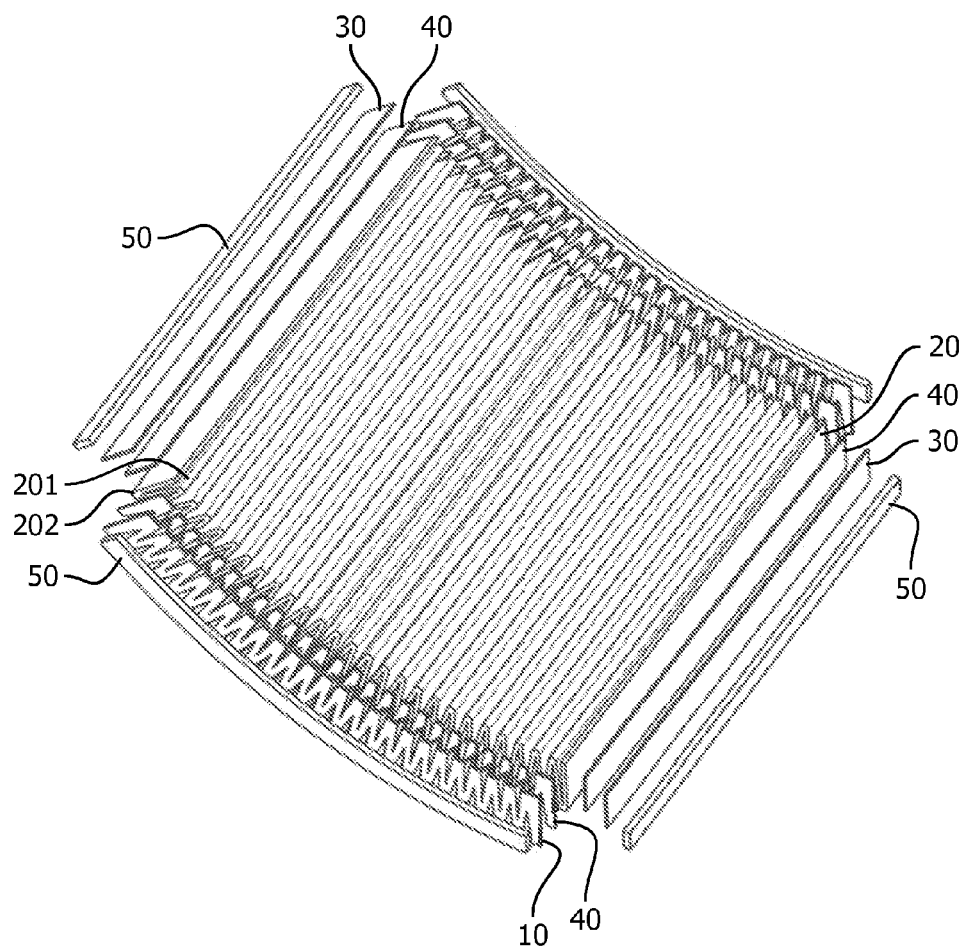
FIG. 1 shows an exploded view of the filter according to an embodiment of the invention.

FIG. 1 shows an explosive view of the filter 1 according to an embodiment of the invention. The filter comprises filtering member 20, side strips 10 and end strips 30. The side strips 10 and end strips 30 form a frame to hold the filtering member 20, such that the filtering member 20 can be enclosed by the frame formed by the side strips 10 and end strips 30. Since the filtering member 20 is enclosed by the side strips 10 and end strips 30, air will not escape from the edge of the filtering member 10. The filter 1 may alternatively comprise sealing material 50. The sealing material 50 can be sponge type materials around the frame to enhance the sealing effect.

It should be understood that the filter 1 could be an air filter. But it is not limited that the filter 1 is only used for air filtering.

From FIG. 1, it could be seen that the filtering member 20 comprises a plurality of folds 200. The folded structure can also be referred to as corrugated or pleated structure. Each fold comprises a peak 201 and a bottom 202.

The strip 10 can be used in the application for particulate matters filtration or gaseous chemical decontamination for residential, commercial, industrial and any other applications requiring air treatments, such as air cleaning, air purification, air deodorizing, air decontaminating, mainly including but not limited to (1) particulate matters (PM)

filtration: capturing dust, pollen, smoke, airborne microorganisms, and (2) gaseous chemical pollutants (GCP) elimination: decontaminating volatile organic compounds, carbonyl compounds, sulfur oxides, nitride oxides, ammonia, etc.

Figure 2:
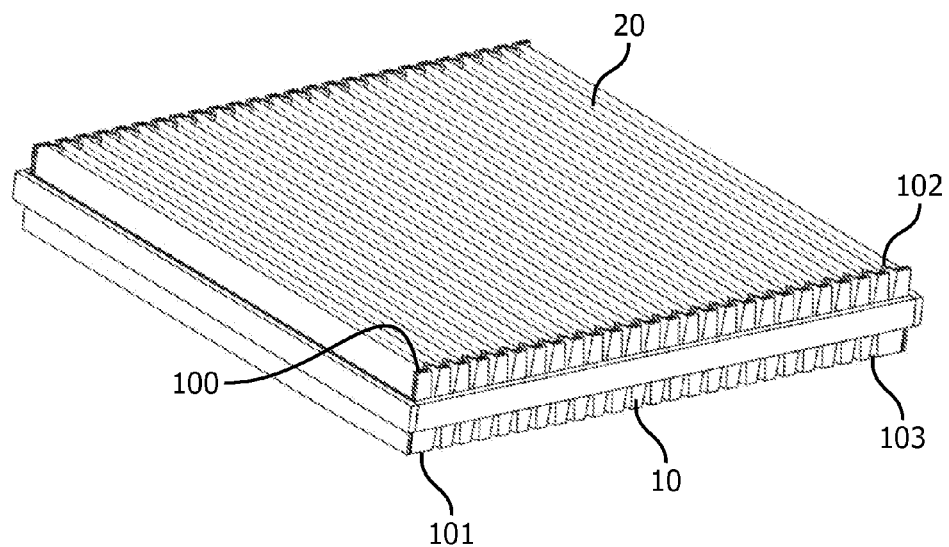
FIG. 2 shows a perspective view of the filter according to an embodiment of the invention.

FIG. 2 shows a perspective view of the filter 1 according to an embodiment of the invention. From FIG. 2, it is clear that the filtering member 20 is enclosed by the side strips 10. The side strips 10 are taken as an example for illustration. It is also understandable that although not needed, the end strips 30 can also be corrugated as the side strip 10. FIG. 2 shows the side strip 10 in its actual operation conditions. In FIG. 2, the upper side of the strip is denoted as the first side 100, and the lower side of the strip is denoted as the second side 101. Those skilled in the art can understand that in the context of the description, the phrases "first side" and "second side" are only for the purpose of illustration.

Figure 3:
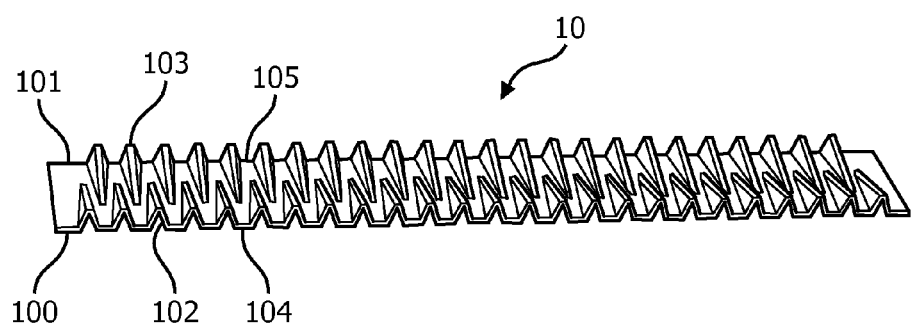
FIG. 3 shows a perspective view of the strip according to an embodiment of the invention.

FIG. 3 shows a perspective view of the side strip 10. Referring to FIG. 3 in combination with FIG. 2, the side strip 10 comprises a plurality of first creases 102 distributed along the first side 100 of the strip 10, and a plurality of second creases 103 distributed along the second side 101 of the side strip 10. The plurality of first creases 102 is able to extend and the plurality of second creases 103 is able to shrink, thereby the side strip 10 being bendable towards the second side. Here, extend means open wider, while shrink means compress. The extension of the first creases 102 and the shrinking of the second creases 103 enable the side strip 10 to bend towards the second side 100 where the first creases 102 are distributed. In this context, the term "bendable towards the second side" means that the first side 100 of the side strip 10 expanded and the second side 101 of the side strip 10 restricted. Although the bending status is not shown in the drawings, this state can be imagined as the opposite of the state shown in FIG. 4.

It is possible that only part of the plurality of the first creases 102 extend, and only part of the plurality of the second creases 103 shrink, which can also achieve the effect to bending of the side strip 10.

Of course, it is desirable that each first crease 102 extends, and each second crease 103 shrinks, so that the tension is distributed among the first creases 102, and the compressive force is distributed among the second creases 103. Such that the duration of the side strip 10 will be guaranteed, because the force applied to the side strip 10 for bending can be dispersed, preferably evenly distributed among these creases.

Figure 4:
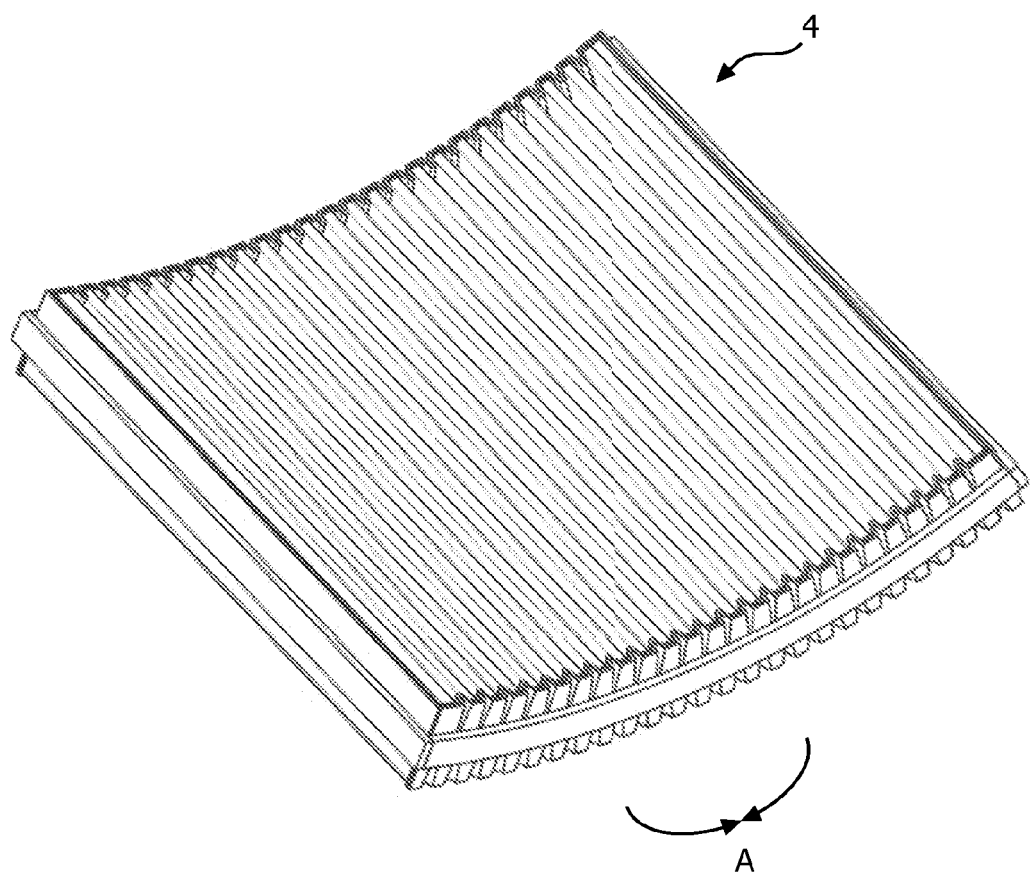
FIG. 4 shows a filter in its bending states according to an embodiment of the invention.

In another embodiment, the plurality of the first creases 102 is able to shrink and the plurality of second creases 103 is able to extend, thereby the strip is bendable towards second side 101. it is shown in FIG. 4 as filter 4, illustrated by Arrow A.

Figure 5:
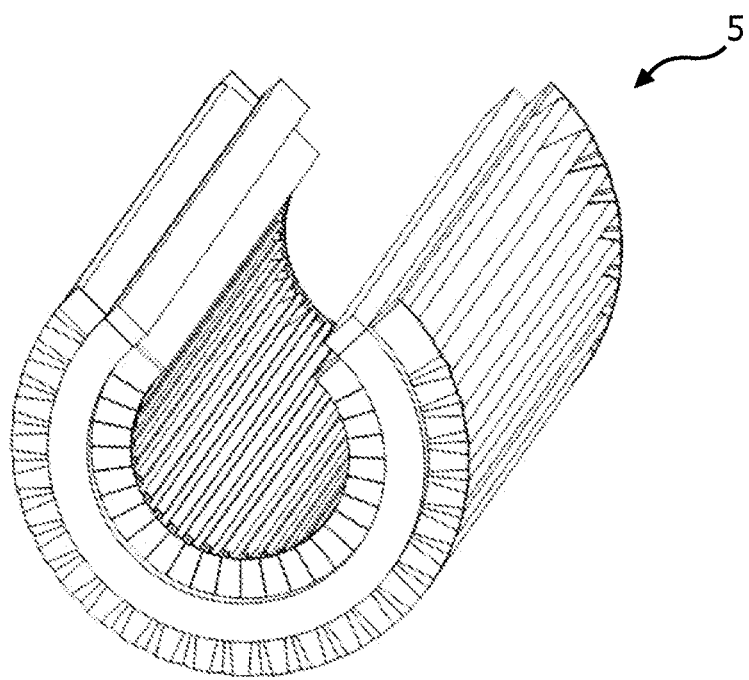
FIG. 5 shows a filter in its cylindrical states according to an embodiment of the invention.

FIG. 5 shows a filter in its cylindrical states according to an embodiment of the invention. In FIG. 5, the shape of the filter 5 can be bended to circular arc.

In another embodiment, the plurality of first creases 102 and the plurality of second creases 103 are protruding towards a same direction. It could be easily seen from FIG. 3 that both first creases 102 and second creases 103 are protruding upwards.

Since the first creases 102 and the second creases 103 are protruding towards the same direction, the protrusions of the first creases 102 and the second creases 103 can be used to restrict folds of the filtering member 20 within appropriate locations.

In another embodiment, the plurality of first creases 102 and the plurality of second creases 103 are alternating along the longitudinal direction of the side strip 10. The longitudinal direction of the side strip 10 is depicted by Arrow A in FIG. 3.

As shown clearly in FIG. 3 that the first crease 102 is not aligned with the second crease 103. In fact, each first crease 102, except the first crease 102 at the edge, interleaves with two second creases 103.

From FIG. 3, it could also be seen that, the side strip 10 comprises a first flat portion 104 between each pair of neighboring first creases 102, and a second flat portion 105 between each pair of neighboring second creases 103. The first flat portion 104 are located on the first side 100 of the side strip 10, while the second flat portion 105 are located on the second side 101 of the side strip 10.

To be specific, each pair of adjacent first creases 102 restrict the peak or crest 201 of the fold 200, and each pair of adjacent second creases restrict the bottom or trough 202 of the fold 200. Referring to FIG. 1, the peak or crest 201 of the fold 200 refers to the part on a wave with the maximum value or upward displacement within a cycle. The bottom or trough 202 of the fold 200 is the opposite of a crest 201, which refers to the minimum or lowest point in a cycle. Those skilled in the art can understand that the term peak and bottom are relative. For example, viewing from the top view shown in FIG. 2, bottom 202 is a concave region, and peak 201 is a convex region. Of course when viewed the bottom, bottom 202 forms a ridge; and, peak 201 forms a trough.

In this embodiment, each pair of neighboring first creases 102 holds a fold 200 of the filtering member 20 in the proper location. With the above configuration of the first creases 102 and the second creases 103, a zigzag path is formed by the spacing between neighboring first crease 102 and second crease 103. Therefore, folds 200 of the filtering member 20 can be restricted along the zigzag path.

In another embodiment, both the length of each of the plurality of the first creases 102 and the length of each of the plurality of the second creases 103 are larger than half width of the side strip 10 and less than the width of the strip 10.

In this embodiment, the sum of the length of the first creases 102 and the length of the second creases 103 are larger than the width of the side strip 10, so as to enable the side strip 10 to bend towards the first side 100 or the second side 101. The length of the first creases 102 and the length of the second creases 103 are less than the width of the side strip 10, so that the creases 102 will not split the side strip 10.

Preferable, the length of the first creases 102 and the length of the second creases 103 are less than ⅔ of the width of the side strip 10, so as to guarantee the strength of the side strip 10, to avoid undesirable break apart of the side strip 10.

In another embodiment, the cross section of each of the plurality of first creases 102 is decreasing from the first side 100 to the second side 101, and the cross section of each of the plurality of second creases 103 is decreasing from the second side 101 to the first side 101.

In this embodiment, the first creases 102 are tapered from the first side 100 to the second side 101, and the second creases 103 are tapered from the second side 101 to the first side 100. In other words, the first creases 102 are tapered from the lateral edge of the side strip 10 to the internal part of the side strip 10, and the second creases 103 are tapered from another lateral edge of the side strip 10 to the internal part of the side strip 10. With the tapered structure, the first crease 102 and the second crease 103 are easy to extend or shrink.

In another embodiment, each of the plurality of first and second creases 102,103 is of a ridge shape.

The ridge can be of various shapes, such as in equilateral, isosceles, or right triangle shapes, etc.

Alternatively, each of the plurality of first and second creases 102,103 can be of a circular cone shape.

In another embodiment, the side strip 10 is made of polymer material, and the plurality of first and second creases 102,103 are formed integrally on the strip.

In this embodiment, the side strip 10 can be made of polymer material, such as non-woven materials, etc. Such material has certain strength to support the filtering member 20, so that the side strip are tightly fit the filtering member 20, and avoid the filtered air to escape from the side edge of the filtering member 20.

Referring back to FIG. 2, the detailed structure of the filter 1 will be elucidated. The filter 1 comprises two opposite side strips 10 for supporting a filtering member 20; the filtering member 20 having a plurality of folds 200, wherein the first crease 102 is received by neighboring peaks 201 of folds 200, and the second crease 103 is received by neighboring bottoms 202 of folds 200.

In this embodiment, the side strip 10 is used as the frame for holding the filtering member 20. A fold 200 can be divided into two parts: a peak 201 and a bottom 202. When the side strip 10 and the filtering member 20 are assembled into the filter 1, if the first creases 102 are upwards and the second creases 103 are downwards as shown in FIG. 2, then the neighboring first creases 102 of the side strip 10 are used to receive the peak 201 of a fold 200, the neighboring second creases 103 of the side strip 10 are used to receive the bottom 202 of a fold 200, and the zigzag path between the first crease 102 and the second crease 103 is used to receive the folds 200.

In another embodiment, the filter 1 further comprises adhesive material 40, for binding the filtering member 20 with the strips 10 and 30. The adhesive material 40 may be disposed on either the side strip 10 or end strip 30, or the filtering member 20.

With the adhesive material 40, the strips 10 and 30 and the filtering member 20 can be bound together. Therefore, it is hard for the filtering member 20 to get out of the frame formed by the strips 10 and 30 when the filter 1 is bended. Thus the phenomena of leakage of air can be avoided, and the filtration efficiency can be further improved. It is appreciated that the adhesive material 40 is optional. The filter can still achieve the filtering effect without the use of adhesive material 40.

Figure 6:
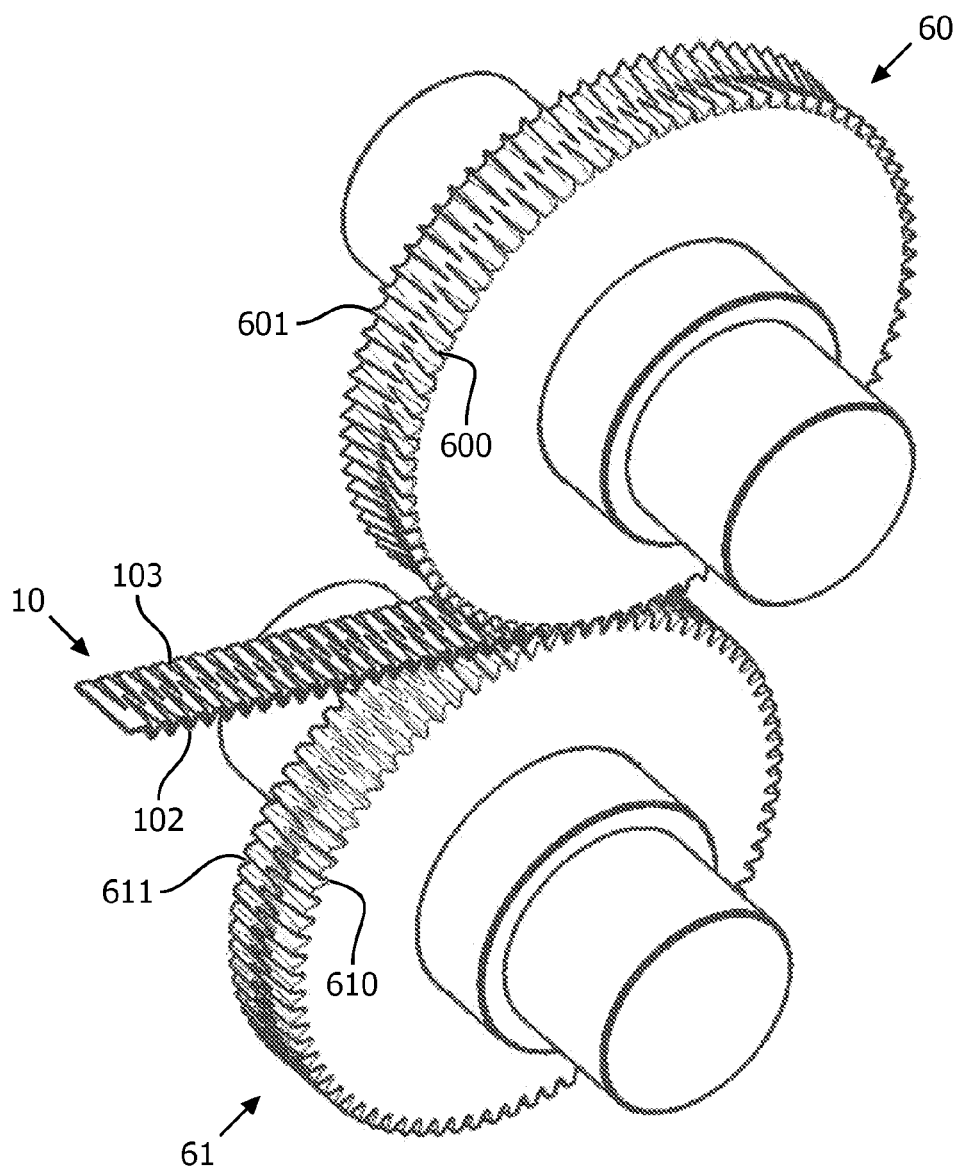
FIG. 6 shows a schematic view for processing the strip according to an embodiment of the invention.

FIG. 6 shows an apparatus 6 for producing the side strip 10 according to an embodiment of the invention. The apparatus 6 comprises: a first roller 60 and a second roller 61 opposed to each other, for rolling a workpiece into the strip 10; wherein the first roller 60 has a plurality of first protrusions 600 on one side of the outer surface of the first roller 60 and a plurality of second protrusions 601 on the other side of the outer surface of the first roller 60. The second roller 61 has a plurality of first recesses 610 on one side of the outer surface of the second roller 61 and a plurality of second recesses 611 on the other side of the outer surface of the second roller 61, and the plurality of first and second recesses 610 and 611 receive the plurality of first and second protrusions 600,601 respectively when the two rollers 60 and 61 roll, for shaping the plurality of first and second creases 102 and 103 of the side strip 10.

In this embodiment, the first roller 60 and the second roller 61 are specially designed so as to process the workpiece into the side strip 10. It is noticeable from FIG. 6 that the workpiece passes into nip or bite between first roller 60 and second roller 61. The first roller 60 has protrusions 600 and the second roller 61 has recesses 601 that will give the general desired shape of the creases after the workpiece passes through the nip. After passing through the nip, the workpiece becomes corrugated with creases across the machine direction.

In another embodiment, the plurality of the first protrusions 600 and the plurality of the second protrusions 601 are alternating. Besides, the plurality of the first recesses 610 and the plurality of the second recesses 611 are alternating. Therefore, the strip after the processing of the first roller 60 and second roller 61 has alternating first and second creases accordingly.

In another embodiment, the distance between the rolling surfaces of the first roller and the second roller are from 0.5 mm to 3.0 mm, so as to allow the workpiece to pass through the space and to be processed by the rollers.

Figure 7:
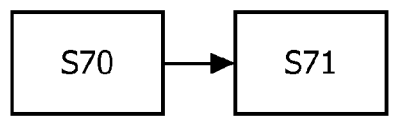
FIG. 7 shows a flow chart of the method for producing the strip according to an embodiment of the invention.

FIG. 7 shows a flow chart for producing the strip. The method comprises step S70 of rolling the apparatus show in FIG. 6; and step S71 of feeding a workpiece into the apparatus; wherein the first roller and the second roller are heated to 125 to 315 degree Celsius.

With this rolling process, the strips can be mass produced; therefore the production cost can be reduced.

In another embodiment, the first roller 60 and the second roller 61 are heated to different temperature, so that the outer surface of the strip 10 which contacts the first roller 60 and the inner surface of the strip 10 which contacts the second roller 61 can have different surface property. For example, the outer surface is desirable to be smooth and hard, while the inner surface is desirable to be soft which could absorb more glue for connection with the pleated folds. Therefore, the temperature of the first roller and the second roller can be chosen accordingly. For example, the temperature of the first roller 60 can be chosen to 300 degree Celsius, and the second roller 61 can be chosen to 200 degree Celsius.

Those skilled in the art could understand that features recited in separated dependent claims may be advantageously combined. For example, the feature that the plurality of first creases and the plurality of second creases are protruding towards a same direction and the feature that the plurality of first creases and the plurality of second creases are alternating along the longitudinal direction of the strip can be combined to yield a further embodiment.

Those ordinary skilled in the art could understand and realize modifications to the disclosed embodiments, through studying the description, drawings and appended claims. All such modifications which do not depart from the spirit of the invention are intended to be included within the scope of the appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim. The term "at least one of A, B, C" can cover any or any combination of the following: 1. A alone, 2. B alone, 3. C alone, 4. A and B, 5. A and C, 6. B and C, 7. A, B, C.

What is claimed is:

1. A side strip for supporting a side of a filtering member of a filter, the filtering member having a plurality of folds, the strip comprising:

a plurality of first creases protruding from a first surface of the strip and distributed along a first longitudinal side of the strip; and a plurality of second creases protruding from the first surface of the strip and distributed along a second longitudinal side of the strip;

wherein the first creases of the strip fit between neighboring peaks of the folds of the filtering member, and the second creases of the strip fit between neighboring bottoms of the folds of the filtering member, wherein the plurality of first creases are able to extend, and the plurality of second creases are able to shrink, such that the strip is bendable towards the second longitudinal side, and wherein the cross-section of each of the plurality of first creases decreases from the first longitudinal side to the second longitudinal side, and the cross-section of each of the plurality of second creases decreases from the second longitudinal side to the first longitudinal side.

2. The strip according to claim 1, wherein the plurality of first creases are able to shrink and the plurality of second creases are able to extend, thereby the strip being bendable towards the first longitudinal side.

3. The strip according to claim 1, wherein the plurality of first creases and the plurality of second creases are protruding towards a same direction.

4. The strip according to claim 1, wherein the plurality of first creases and the plurality of second creases are alternating along the longitudinal direction of the strip.

5. The strip according to claim 1, further comprising a first flat portion between each pair of neighboring first creases, and a second flat portion between each pair of neighboring second creases.

6. The strip according to claim 1, wherein the sum of the lengths of one of the plurality of the first creases and one of the plurality of the second creases are larger than the width of the strip, and each of the length of the first creases and that of the second creases is less than the width of the strip.

7. The strip according to claim 1, wherein each of the plurality of first and second creases is of a ridge shape.

8. A strip according to claim 1, wherein the strip is made of polymer material, and the plurality of first and second creases are formed integrally on the strip.

9. The strip of claim 1, wherein the first surface of the side strip covers a separation space between the folds of the filtering member and is shaped to prevent air from escaping from a side edge of the filtering member.

10. The strip of claim 1, wherein the strip closes off the side of the filtering member to prevent air leakage from the side of the filtering member.

11. The strip of claim 1, wherein the first creases cause the strip to be corrugated along the first longitudinal side of the strip.

12. The strip of claim 1, wherein the first creases have shapes matching protrusions on a roller that processed the strip.

13. A filter comprising:
a filtering member having a plurality of folds; and
a first strip supporting a first side of the filtering member and closing off the first side of the filtering member to prevent air leakage from the side of the filtering member, the first strip comprising:
a plurality of first creases protruding from a first surface of the first strip and fitting between neighboring peaks of the folds of the filtering member, the first creases further extending from a first longitudinal side of the first strip toward a second longitudinal side of the first strip, each of the plurality of first creases having a cross-section that decreases in size from the first longitudinal side toward the second longitudinal side; and
a plurality of second creases protruding from the first surface of the first strip and fitting between neighboring bottoms of the folds of the filtering member, the second creases further extending from the second longitudinal side of the first strip toward the first longitudinal side of the first strip, each of the plurality of second creases having a cross section that decreases in size from the second longitudinal side toward the first longitudinal side,
wherein the first creases are able to extend and the second creases are able to shrink such that the first strip is bendable towards the second longitudinal side of the first strip.

14. The filter according to claim 13, further comprising:
a second strip supporting a second side of the filtering member; and
adhesive material binding the filtering member with the first strip and the second strip.

* * * * *